United States Patent Office 3,632,804
Patented Jan. 4, 1972

3,632,804
GLYCOSE HYDROCARBON SULFONATE SURFACTANTS
Roy A. Gray, Edmund T. Kittleman, and Gardner C. Ray, Bartlesville, Okla., assignors to Phillips Petroleum Company
No Drawing. Filed Jan. 3, 1969, Ser. No. 788,958
Int. Cl. C07c 69/32
U.S. Cl. 260—234 R
20 Claims

ABSTRACT OF THE DISCLOSURE

Novel surfactants and processes of producing same by forming alkali metal salts of a saccharide and reacting the so-formed alkali metal salts with a hydrocarbonsulfonyl halide.

---

The present invention relates to novel surface active agents and processes for producing such from saccharides.

In recent years there has been considerable demand for biodegradable surface active agents adapted for use in synthetic detergents. Non-biodegradable detergents, due to their slow degradability, pass through ordinary sewage treatment systems and appear in well waters and also create serious foaming problems in sewage treating plants and waters where the effluent is ultimately discharged. Surface active agents which are easily degraded or broken down by bacteria reduce these problems.

It is a principal object of this invention to provide novel surfactants possessing good detergents properties and which are biodegradable.

It is another object of this invention to provide novel processes for preparing the surfactants of this invention.

The novel surfactants of this invention are glycose hydrocarbonsulfonates. These surfactants are formed in two steps. The first step involves the formation of an alkali metal glycate, that is an alkali metal salt of a sugar. In the second step the alkali metal glycate is reacted with a hydrocarbonsulfonyl halide. The reactions involved in the present synthesis can be represented as follows:

Step 1:

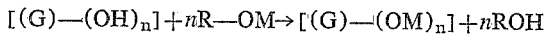

Step 2:

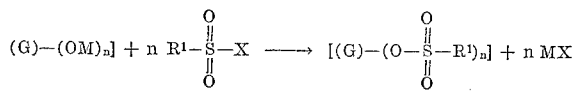

wherein:

M is an alkali metal such as lithium, sodium, potassium, rubidium or cesium,

R is an alkyl, cycloalkyl, aryl, alkaryl, cycloalkylaryl arylcycloalkyl, cycloalkylalkyl, alkylcycloalkyl or aralkyl group having up to and including 12 carbon atoms such as methyl, ethyl, isopropyl, butyl, cyclododecyl, 4-cyclohexylphenyl, 4-phenylcyclohexyl, isobutyl, hexyl, octyl, decyl, 3-cyclohexylpropyl, 2-ethylcyclohexyl, dodecyl cyclobutyl, cyclopentyl, cyclohexyl, phenyl, benzyl, isooctylphenyl, xylyl and the like, X is chlorine, bromine or iodine, $n$ is an integer of from 1 to 12 inclusive, preferably 1 to 6 inclusive, and $R^1$ is alkyl or cycloalkyl having from about 6 to 25 carbons atoms inclusive, preferably 12 to 18 carbon atoms inclusive, such as hexyl, octyl, isooctyl, pentacosyl, decyl, dodecyl, tetradecyl, hexadecyl, cyclododecyl, octadecyl, nonadecyl cyclohexyl, cycloheptyl, cyclooctyl, cyclopentacosyl, cyclononyl, cyclooctadecyl, cyclodecyl and the like.

The representation $[(G)—(OH)_n]$ represents a glycose molecule and the $(OH)_n$ groups thereof can be any of the active hydroxyl groups in the molecule.

Particularly preferred glycose hydrocarbonsulfonates of this invention are those formed from a straight chain 1-alkanesulfonyl halide in which the alkane moiety contains from 12 to 18 carbon atoms inclusive.

The preparation of the alkali metal glycate can be accomplished by various means as is known in the art. One suitable means, as illustrated in the above reaction (Step 1) is by reaction of a glycose with an alkali metal hydrocarboxide. This reaction is normally carried out under substantially anhydrous conditions.

Step 2 of the process of this invention wherein the novel glycose hydrocarbonsulfonates are synthesized from hydrocarbonsulfonyl halides and alkali metal glycates is accomplished by bringing together the reactants at a temperature in the range from —10 to 25° C. under pressure sufficient to maintain the reactants substantially completely in the liquid phase. The reaction is generally complete in periods ranging from about 5 minutes to about 48 hours. It is preferred that the reaction be carried out under substantially anhydrous conditions. Moreover, if desired, suitable diluents can be employed. Any diluent that is substantially nonreactive under the reaction environment can be utilized; examples of suitable diluents being N,N-dimethylformamide, tetrahydropyran, N-methylpyrrolidone, tetrahydrofuran, N,N-diethylacetamide and the like.

Although the number of hydrocarbonsulfonate groups in the glycose hydrocarbonsulfonate product will be limited by the number of alkali metaloxy groups of the alkali metal glycate, the number of hydrocarbonsulfonate groups of the product is also affected by the mole ratio of alkali metal glycate to hydrocarbonsulfonyl halide e.g., a high proportion of hydrocarbonsulfonyl halide will result in a glyclose hydrocarbonsulfonate having a greater number of hydrocarbonsulfonate groups than if a smaller proportion of hydrocarbonsulfonyl halide is employed. Generally, mole ratios of alkali metal glycate to hydrocarbonsulfonyl halide in the range of about 0.01:1 to about 100:1 and preferably ratios in the range of about 0.1:1 to about 10:1 are employed. The glycose hydrocarbonsulfonate product can be recovered by conventional techniques such as, for example, solvent extraction, distillation, filtation, and the like, or combinations thereof.

The hydrocarbonsulfonyl halides which are employed according to this invention can be synthesized by any convenient means. For example, such compounds can be prepared in accordance with the teachings of United States Pat. 3,238,255, which relates to sulfoclhorination of hydrocarbons. Likewise, a terminal olefin of suitable nature can be reacted with thiolacetic acid followed by hydrolysis to yield the respective terminal thiol which can subsequently be halogenated in the presence of water to yield the 1-alkane sulfonyl halide desired. Suitable means of effecting these syntheses are disclosed by L. Bateman et al., J. Chem. Soc., 2838 ( 1958) and Douglas and Johnson, J. Am. Chem. Soc. 60, 1486 (1938).

The glycoses which can be employed in accordance with this invention include mono and polysaccharides, having in the range of 1 to about 5 mono-saccharide units. Each saccharide unit can contain in the range of about 4 to about 7 carbon atoms, and can be either an aldose or a ketose unit. Representative examples of suitable glycoses are sucrose, fructose, sorbose, glucose, maltose, mannose, galactose, threose, xylose, arabinulose, lactose, raffinose, stachyose, and the like. Glycoses of this group which are non-reducing sugars are preferred and non-reducing disaccharides, such as sucrose, are particularly preferred.

The invention is further illustrated by the following examples.

EXAMPLE I

The sulfochlorination of hexadecane is accomplished according to the process of United States Patent 3,238,255. The mixture is separated by fractional crystallization. Subsequent to separation the resultant mixture is found to be comprised largely of hexadecanesulfonyl chloride.

Sodium sucrate is prepared as follows: A solution comprised of 68.4 grams (200 mmoles) of sucrose in 350 milliliters of anhydrous dimethylformamide is charged to a stirred reactor. A 1 M solution of 50 mmoles of sodium methoxide in methanol is added over a 50 minute period. A white suspension is formed, stripped to a hydroscopic amorphous solid, and further dried in vacuum over $P_2O_5$ to insure complete removal of methanol.

The sodium sucrate prepared above is charged to a stirred reactor, and 300 milliliters of dry N,N-dimethylformamide added. To the stirred reaction mixture over 30 minutes, at a temperature of $-10$ to $0°$ C., is then added 16.3 grams (50 mmoles) of the hexadecanesulfonyl chloride prepared above. Stirring is continued for one additional hour at $-10$ to $0°$ C. An aqueous solution comprised of 20 weight percent sodium chloride (300 milliliters total) is added, and the aqueous phase extracted with three 150 milliliter portions of a solution comprised of a 1:1 volume/volume mixture of heptane and n-butanol. The aqueous phase is then extracted with 150 milliliters of chloroform. The organic extracts are combined and stripped. The residual oil is exposed to a vacuum over $P_2O_5$. The resulting solid is crushed under heptane and washed with additional heptane. The resulting filtrate is dissolved in ethanol and stripped to yield 15.8 grams of sucrose hexadecanesulfonate product. The product is a white hydroscopic solid. Elemental composition for sucrose hexadecanesulfonate is calculated to be: C, 53.3%; H, 8.6%; S, 5.1%. Elemental composition for the sucrose hexadecanesulfonate product is determined to be: C, 52.1%; H, 8.4%; S, 5.9%.

EXAMPLE II

Following the procedure of Example I, potassium fructate is prepared and reacted with dodecanesulfonyl chloride to form as product, fructose dodecanesulfonate.

EXAMPLE III

Following the procedure of Example I, cesium sorbate is prepared and reacted with octanesulfonyl chloride to form as product, sorbose octanesulfonate.

EXAMPLE IV

The procedure of Example I is repeated except that dodecanesulfonyl chloride is prepared rather than hexadecanesulfonyl chloride, and a sucrose dodecanesulfonate is prepared as a product rather than sucrose hexadecanesulfonate. Elemental composition of sucrose dodecanesulfonate is calculated to be: C, 50.2%; H, 8.0%; S, 5.6%. The novel glucose dodecanesulfonate product prepared as a product is found to have the following elemental composition: C, 48.1%; H, 7.7%; S, 6.5%.

EXAMPLE V

In a manner silimar to Example I, lithium maltate is prepared and reacted with decanesulfonyl iodide to form as product, maltose decanesulfonate.

EXAMPLE VI

In a manner similar to Example I, sodium xylate is prepared and reacted with cyclododecanesulfonyl chloride to form as product, xylose cyclododecanesulfonate.

EXAMPLE VII

In a manner similar to Example I, potassium galactate is prepared and reacted with cyclopentacosanesulfonyl bromide to form as product, galactose cyclopentacosanesulfonate.

EXAMPLE VIII

In a manner similar to Example I, lithium mannate is prepared and reacted with nonadecanesulfonyl iodide to form as product, mannose nonadecanesulfonate.

EXAMPLE IX

Following the procedure of Example I, sodium raffinate is prepared and reacted with pentadecanesulfonyl bromide to form as product, raffinose pentadecanesulfonate.

Novel glycose hydrocarbonsulfonates of this invention were evaluated as detergents by washing standard soiled cotton cloth (UST is U.S. Testing Company cloth; TF is Testfabric Company cloth) in a Tergotometer and then measuring the difference in light reflectance between washed and unwashed cloth by means of a Multi-Purpose Reflectometer. The detergency ratings which follow in Table 1 are defined by the relationship: $(IR)_A = (IR)_B$ wherein $(IR)_A$ represents the increase in reflectance obtained in the presence of the active detergent species plus test additives (defined below and $(IR)_B$ denotes increase in reflectance effected by the additives alone. For example, formulations where prepared by dissolving 0.6 gram active ingredient and 2.4 grams test additives (stock solution aliquot) in sufficient water to give two liters of solution. In Table 1, below, the detergency rating at this concentration level is indicated in the 0.15% column $$\left[ \frac{0.6 + 2.4}{2000} \times 100 \right]$$

results based on lower concentration levels are listed in the columns labeled 0.10% and 0.05% and are determined in an analogous manner. Test additives which constituted 80% of the formulation consisted of sodium tripolyphosphate (50%), sodium sulfate (15%), sodium metasilicate (5%), carboxymethyl cellulose (0.8%) and water (9.2%) by weight. The other 20% by weight of each formulation was in each instance made up of the active ingredient, i.e., the surfactant to be tested. $(IR)_B$ values for UST and TF cloths at concentrations of 0.15%, 0.10% and 0.05% were, respectively: 8.2, 10.2; 7.4, 9.6; and 7.4, 9.6.

TABLE 1

| Surfactant | 0.15% | | 0.10% | | 0.05% | |
|---|---|---|---|---|---|---|
| | UST | TF | UST | TF | UST | TF |
| Sucrose 1-tetradecanesulfonates. | 4.5 | 3.9 | 5.6 | 3.8 | 4.4 | 4.3 |
| Sucrose 7-tetradecanesulfonates. | 3.3 | 3.0 | 1.8 | 2.7 | 0.3 | 1.5 |
| Sucrose 1-hexadecanesulfonates. | 5.7 | 3.7 | 5.1 | 4.8 | 4.6 | 3.2 |
| Sucrose random-hexadecanesulfonate (Example I). | 3.9 | 2.4 | 4.1 | 2.7 | 3.0 | 2.2 |
| Sucrose 1-dodecanesulfonates. | 4.1 | 3.1 | 4.0 | 3.2 | 1.4 | 2.5 |
| Sucrose 1-octadecanesulfonates. | 4.6 | 4.0 | 4.7 | 3.8 | 3.7 | 2.8 |
| Sucrose dodecanesulfonate (Example IV) | 1.6 | 2.8 | 0.9 | 2.1 | −0.5 | 1.7 |

The data of Table 1 show that the glycose hydrocarbonsulfonates are useful as surfactants in detergents. It will also be noted that the preferred straight chain glycose 1-alkanesulfantes exhibit superior detergency properties.

The glycose hydrocarbonsulfonates of this invention are biodegradable under both aerobic and anarobic conditions.

Those modifications and equivalents which fall within the spirit of the invention are to be considered a part thereof.

We claim:
1. A glycose hydrocarbonsulfonate wherein the hydrocarbon moiety is an alkyl or cycloalkyl radical containing from 6 to 25 carbon atoms.
2. A compound in accordance with claim 1, wherein the alkyl or cycloalkyl radical contains from 12 to 18 carbon atoms.
3. A compound in accordance with claim 1, wherein the hydrocarbon moiety is a straight chain alkyl radical containing from 12 to 18 carbon atoms.

4. A compound in accordance with claim 1, wherein the glycose hydrocarbonsulfonate is a glycose 1-alkanesulfonate wherein the alkane moiety contains from 12 to 18 carbon atoms.

5. A compound in accordance with claim 1, wherein the glycose is a non-reducing glycose.

6. A compound in accordance with claim 1, wherein the glycose is sucrose.

7. A compound in accordance with claim 3, wherein the glycose is a non-reducing glycose.

8. A compound in accordance with claim 3, wherein the glycose is sucrose.

9. A compound in accordance with claim 4, wherein the glycose is a non-reducing glycose.

10. A compound in accordance with claim 4, wherein the glycose is sucrose.

11. A process of synthesizing a glycose hydrocarbonsulfonate which comprises forming an alkali metal salt of a glycose, and reacting the alkali metal salt of the glycose with a hydrocarbonsulfonyl halide in which the hydrocarbon moiety is an alkyl or cycloalkyl radical containing from 6 to 25 carbon atoms.

12. A process in accordance with claim 11, wherein the hydrocarbonsulfonyl halide employed is one containing 12 to 18 carbon atoms in the hydrocarbon moiety.

13. A process in accordance with claim 11, wherein the hydrocarbonsulfonyl halide employed is one in which the hydrocarbon moiety is a straight chain alkyl radical containing from 12 to 18 carbon atoms.

14. A process in accordance with claim 11, wherein the hydrocarbonsulfonyl halide employed is a 1-alkanesulfonyl halide with the alkane moiety containing from 12 to 18 carbon atoms.

15. A process in accordance with claim 11, wherein an alkali metal salt of a non-reducing glycose is formed.

16. A process in accordance with claim 11, wherein an alkali metal salt of a non-reducing glycose is formed.

17. A process in accordance with claim 13, wherein an alkali metal salt of a non-reducing glycose is formed.

18. A process in accordance with claim 13, wherein an alkali metal salt of sucrose is formed.

19. A process in accordance with claim 14, wherein an alkali metal salt of a non-reducing glycose is formed.

20. A process in accordance with claim 14, wherein an alkali metal salt of sucrose is formed.

References Cited

UNITED STATES PATENTS

| | | | |
|---|---|---|---|
| 2,212,521 | 8/1940 | Harris | 260—234 |
| 2,671,779 | 3/1954 | Gaver et al. | 260—234 |
| 2,686,779 | 8/1954 | Jones | 260—234 |
| 2,897,193 | 7/1959 | Novak | 260—324 |
| 3,057,855 | 10/1962 | Smith et al. | 260—234 |
| 3,413,284 | 11/1968 | Grotsch et al. | 260—234 |

LEWIS GOTTS, Primary Examiner

J. R. BROWN, Assistant Examiner

U.S. Cl. X.R.

252—138, 161

UNITED STATES PATENT OFFICE
CERTIFICATE OF CORRECTION

Patent No. 3,632,804            Dated January 4, 1972

Inventor(s) ROY A. GRAY, EDMUND T. KITTLEMAN and GARDNER C. RAY

It is certified that error appears in the above-identified patent and that said Letters Patent are hereby corrected as shown below:

Column 4, line 17, "$(IR)_A=(IR)_B$" should be -- $(IR)_A-(IR)_B$ -- line 20, after "below" insert a closing parenthesis line 22, "where" should be -- were -- line 59, "1-alkanesulfanates" should be
                -- 1-alkanesulfonates --

Column 6, line 7, delete "a non-reducing glycose" and in
               lieu thereof insert -- sucrose --

Signed and sealed this 13th day of June 1972.

(SEAL)
Attest:

EDWARD M. FLETCHER, JR.          ROBERT GOTTSCHALK
Attesting Officer                 Commissioner of Patents